US009621835B2

(12) United States Patent
McRae (10) Patent No.: US 9,621,835 B2
(45) Date of Patent: Apr. 11, 2017

(54) RETAIL DEMO MODE ON GPS OR IP REVERSE LOOK UP

(71) Applicant: Vizio Inc, Irvine, CA (US)

(72) Inventor: Matthew Blake McRae, Irvine, CA (US)

(73) Assignee: Vizio, Inc, Irvine, CA (US)

( * ) Notice: Subject to any disclaimer, the term of this patent is extended or adjusted under 35 U.S.C. 154(b) by 0 days.

(21) Appl. No.: 14/514,202

(22) Filed: Oct. 14, 2014

(65) Prior Publication Data

US 2016/0105626 A1  Apr. 14, 2016

(51) Int. Cl.
| | |
|---|---|
| *H04N 3/27* | (2006.01) |
| *H04N 5/44* | (2011.01) |
| *H04N 5/57* | (2006.01) |
| *H04N 5/60* | (2006.01) |
| *H04N 21/443* | (2011.01) |
| *H04N 21/45* | (2011.01) |
| *H04N 21/422* | (2011.01) |
| *H04N 21/4363* | (2011.01) |
| *H04N 21/442* | (2011.01) |
| H04N 21/485 | (2011.01) |

(52) U.S. Cl.
CPC ............ *H04N 5/44* (2013.01); *H04N 5/57* (2013.01); *H04N 5/60* (2013.01); *H04N 21/42202* (2013.01); *H04N 21/43637* (2013.01); *H04N 21/4424* (2013.01); *H04N 21/4432* (2013.01); *H04N 21/4524* (2013.01); *H04N 21/4852* (2013.01); *H04N 21/4854* (2013.01)

(58) Field of Classification Search
CPC ........ H04N 5/44; H04N 5/44513; H04N 5/57; H04N 5/58; H04N 21/42202; H04N 21/43637; H04N 21/4424; H04N 21/4432; H04N 21/4524; H04N 21/4852; H04N 21/4854
USPC ........ 348/553, 571, 569, 730, 602, 725, 734
See application file for complete search history.

(56) References Cited

U.S. PATENT DOCUMENTS

| | | | |
|---|---|---|---|
| 7,009,659 B2 * | 3/2006 | Dew ................. | H04N 5/44513 348/553 |
| 7,697,943 B2 * | 4/2010 | Jung ................. | H04M 1/72572 455/404.2 |

(Continued)

*Primary Examiner* — Trang U Tran
(74) *Attorney, Agent, or Firm* — Law Office of Scott C Harris Inc (57) ABSTRACT

A device such as a television automatically determines, on initial power up, its geographical location. If the television is determined to be residing in a retail store location it will automatically default to retail mode where picture and audio quality will be set to pre-specified settings conducive to a retail environment where the ambient light and sound levels are not what would typically be found in a residential environment. The invention consists of a software module and a database resident in the television that can determine, from interrogating either a GPS chip set, or obtaining identifying data from an attached wired or wireless network and matching the data to identifying data for retail store locations to determine if the television is located in a retail store. If the location of the television is determined to be in a retail store the television will initialize the video and audio quality for a retail store environment. If the location of the television is determined to not be in a retail store, the television will initialize the video and audio quality for a residential environment.

13 Claims, 7 Drawing Sheets

(56) References Cited

U.S. PATENT DOCUMENTS

| | | | |
|---|---|---|---|
| 8,345,170 B2* | 1/2013 | Iwata | H04N 5/57 348/730 |
| 8,553,153 B2* | 10/2013 | De Vaan | G09F 27/00 348/602 |
| 2004/0260682 A1* | 12/2004 | Herley | G06K 9/00496 |
| 2007/0260988 A1* | 11/2007 | Miller | H04N 5/44513 715/744 |

* cited by examiner

RETAIL DEMO MODE ON GPS OR IP REVERSE LOOK UP

BACKGROUND

Televisions sold in retail locations are generally, manually placed into what is known in the art as "Retail Mode". Retail locations generally are environments where the ambient light levels and ambient audio levels are quite high. Home environments on the other hand generally have ambient light and sound levels that are substantially lower than retail environments. A television with brightness levels and color saturation suitable for the home environment will appear washed out and dim in a retail environment. To counter the issues with retail environments, televisions are currently set up in retail environments such that picture quality and audio quality are manually set to prevent the display from being washed out and the audio equalization setup such that it is easier to hear over loud background sounds.

SUMMARY

The inventor recognized a need for a television to automatically determine if it is in a retail environment or a home environment and to set up the display variables such that the first time power is applied, the screen variables are automatically set to be appropriate for the environment.

Embodiments describe systems and methods for a television to automatically determine, on initial power up, its geographical location.

If the television is determined to be residing in a retail store location, the television operates to automatically default to retail mode where picture and audio quality are set to pre-specified settings conducive to a retail environment where the ambient light and sound levels are not what would typically be found in a residential environment.

A software module and a database is resident in the television that determines, from interrogating a location detector, e.g., a GPS chip set, or obtaining identifying data from an attached wired or wireless network and matching the data to identifying data for retail store locations to determine if the television is located in a retail store. If the location of the television is determined to be in a retail store, the television will initialize the video and audio quality for a retail store environment. If the location of the television is determined to not be in a retail store, the television will initialize the video and audio quality for a residential environment.

BRIEF DESCRIPTION OF THE DRAWINGS in the drawings.

DETAILED DESCRIPTION

A preferred embodiment operates as discussed herein. After power is applied for the first time to the television, the network electronics of the television are activated. If one or more Wifi networks are discovered, the SSID and MAC addresses are saved in a list. If there are no discoverable Wifi networks, but the television is connected to a wired network, the MAC address is saved in a list. If the television is not connected to a wired or wired network and a GPS chip set is embedded in the television, the GPS electronics are activated, and attempt to discover the minimum number of GPS satellites to determine the geographical coordinates of the television's location. If the geographical coordinates of the television can be determined from the GPS device, the coordinates will be saved in a list.

If the television lacks a GPS chip set, a dialog box is displayed to the user asking if the television is in a retail store. If the user indicates that the television is in a retail store the processor sets up pre-selected picture and audio quality registers and features to make the television more appealing in a retail environment. If the user indicates that the television is not in a retail store, the processor sets up pre-selected picture and audio quality registers and features suitable to a residential environment.

If the invention detects that a Wifi network is discoverable by virtue of a Wifi Access Point (AP) broadcasting its Service Set Identifier (SSID), each discoverable SSID and MAC address is set and saved to a list. The SSID/MAC entries in the list are then matched against a database of SSID/MAC data associated with known retail stores. If a match is made, the television will be detected to be in a retail store location and the initial setup will be defaulted to "Retail Mode".

If the invention determines that no Wifi APs are present, but a wired network is attached to the television, the invention will obtain the physical MAC address and which will then be matched against a database of SSID/MAC data and if a match is made, the television will be assumed to be in a retail store location and the initial setup will be defaulted to "Retail Mode".

If the result of the detection is that television is not connected to a wired network, and that there are no discoverable Wifi networks, the system then determines if a GPS or other kind of location detecting device is embedded within the television. If the television does contain a GPS device, the GPS device is activated, and the system waits a predetermined period of time for the GPS device to discover the minimum number of satellites to compute the geographical location of the television. If the minimum number of satellites is discovered, the coordinates will be saved in a list and matched against a database of GPS coordinates of retail stores that sell the television. If a match is made, the initial setup will be defaulted to "Retail Mode". Note that other systems of determining location can also be used, such as cell tower triangulation or others.

If the location cannot be determined: either through network data or GPS data or because the television is not connected to a wired or wireless network and GPS data cannot be obtained, it will display to the user a dialog message on the display screen requesting the user to indicate if the television is in a retail or residential location. If the user indicates that the television is in a retail store location, the invention will default the initial setup mode to "Retail Mode" otherwise it will default the initial setup mode to "Residential Mode".

The present invention is intended to determine if a television that has just had power applied for the first time is physically located in a retail store location and if it is, the invention will write a set of retail mode data to the control registers that control screen brightness and other display screen variables and audio mode.

Figure 1:
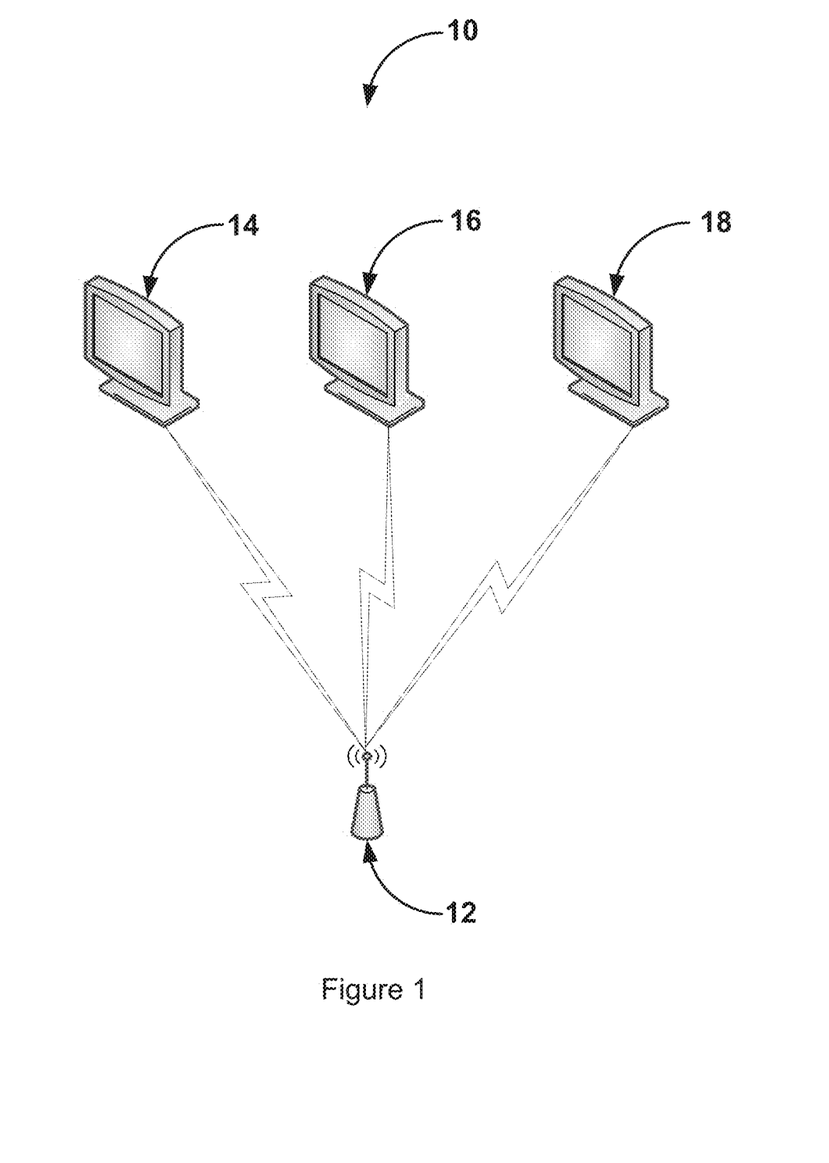
FIG. 1 is a depiction of the invention where televisions determine that they are in a retail space by "sniffing" Wifi signals.

Now referencing FIG. 1 where 10 depicts a retail store where three televisions (14, 16, and 18) have been powered on for the first time. In this depiction, Wifi access point (AP) 12 is monitored by televisions 14, 16, and 18 to determine if AP 12 is broadcasting its SSID. If AP (Access Point) 12 is broadcasting its SSID, each of the televisions will attempt to match the SSID against an entry in its SSID database 62, that stores SSIDs of known retail locations. If any of the received SSID(S) received by a given television (14, 16, or 18) are matched against any of the entries in SSID database 62, that television commands the display and audio attributes into retail mode then completes the process of booting the television. If the SSID(s) received by a given television (14, 16, or 18) are not matched against any of the entries in SSID database 62, that television exits the matching of SSID(S) and start attempting to determine if the television is located in a retail store by attempting to determine the location of the television using GPS coordinates (FIG. 2).

Figure 2:
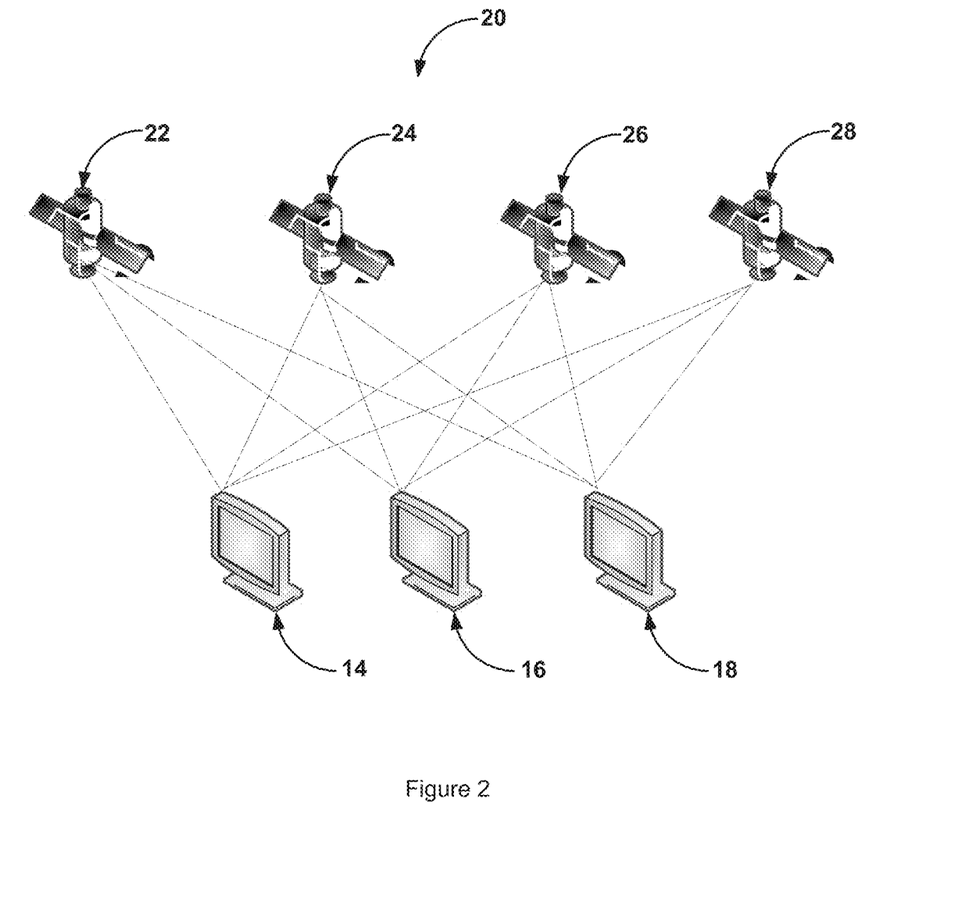
FIG. 2 is a depiction of the invention where televisions determine that they are in a retail space by using GPS signals from satellites to determine they location.

Now referencing FIG. 2 where 20 depicts a retail store where three televisions (14, 16, and 18) have been powered on for the first time. In this depiction, televisions 14, 16, and 18 have powered on GPS chip sets and are attempting to acquire satellites 22, 24, 26, and 28 which depict the minimum number of satellites necessary to establish a single set of accurate coordinates. If a given television acquires four satellites and computes its geographical coordinates, it matches those coordinates against GPS location database 42. If the computed coordinates are matched against any of the entries in GPS location database 42 within the margins of error (e.g., hundreds of feet within a retail store being deemed as being within that retail store), that television commands the display and audio attributes into retail mode then complete the process of booting the television. If the computed GPS coordinates computed by the television (14, 16, or 18) are not matched against any of the entries in GPS location database 42, that television exits the matching of GPS coordinates and querys the user to determine if the television is located in a retail store. If the user indicates that the television is located in a retail store, the television commands the display and audio attributes into retail mode then completes the process of booting the television. If the user indicates that the television is not located in a retail store, the display and audio attributes are commanded into a normal residential mode and then completes the process of booting the television.

Figure 3:
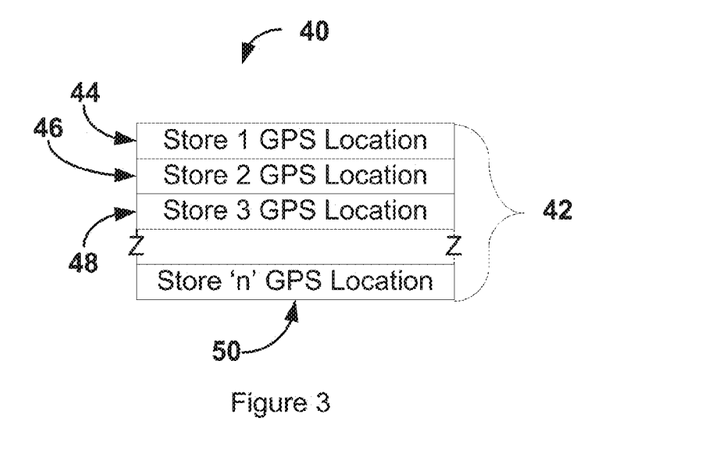
FIG. 3 is a depiction of a GPS database for known retail locations that sell the television.

Now referencing FIG. 3 where 40 depicts GPS location database 42. In this depiction, the GPS coordinates are shown in entries 44 through 50. Each entry in the depiction contains a set of GPS coordinates that correspond to a single store. When a television is comparing a computed set of GPS coordinates to one of the entries in the GPS location database 42, the processor in the television matches the computed coordinates to one of the database entry coordinates. As part of that matching, prior to performing the match, the processor widen the coordinates found in the database such that they would cover the area of the store thus allowing the computed coordinates to fall anywhere within the area of the store footprint. If it is determined that the television is located in a retail store the television commands the display and audio attributes into retail mode then completes the process of booting the television.

Figure 4A:
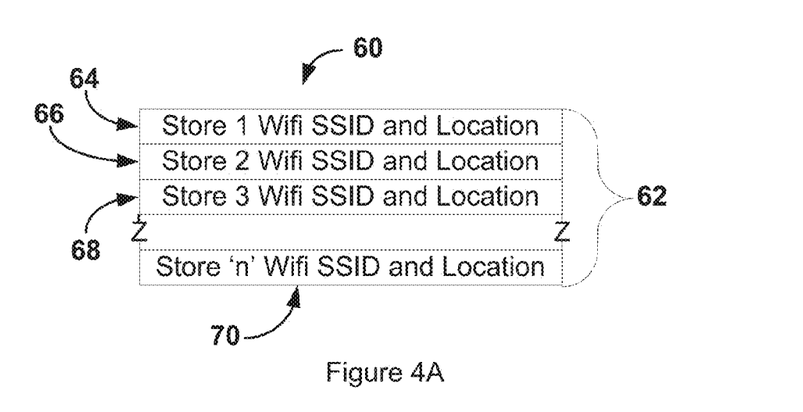
FIG. 4A is a depiction of a Wifi SSID identifying data and location database with the identifying data and locations of known retail locations selling the televisions.

Now referencing FIG. 4A where 60 depicts Wifi SSID database 62. In this depiction, the SSIDs in the database will correspond to that found in a given store. When the power is initially turned on for a given television (14, 16, or 18) for the first time, the television will apply power to the Wifi chip set and begin "sniffing" or monitoring the Wifi spectrum for SSIDs. The processor in the television constructs a list of all SSIDs detected, then passes each of the SSIDs in the list against Wifi SSID database 62. If any of the SSIDs in the list match any entry in SSID database 62, the television is determined to be in a retail store and the television will command the display and audio attributes into retail mode then completes the process of booting the television.

Figure 4B:
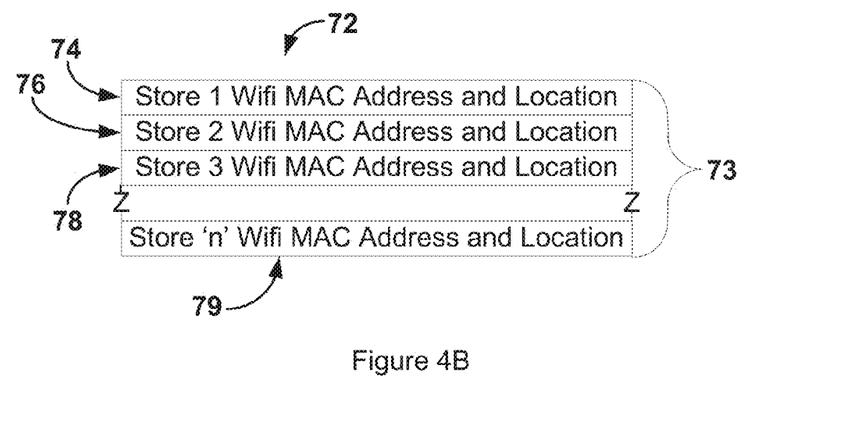
FIG. 4B is a depiction of a MAC address database that identifies the MAC addresses of access points and hard wired routers in retail location that sell the television.

Now referencing FIG. 4B where 72 depicts Wifi MAC address database 73. In this depiction, the Wifi MAC addresses in the database correspond to that found in a given store. When the power is initially turned on for a given television (14, 16, or 18) for the first time, the television attempts to connect to access point 12 using Wifi MAC addresses contained in Wifi MAC address database 73. If any MAC addresses contained in Wifi MAC address database 73, the television is determined to be in a retail store and the television will command the display and audio attributes into retail mode then complete the process of booting the television.

Figure 4C:
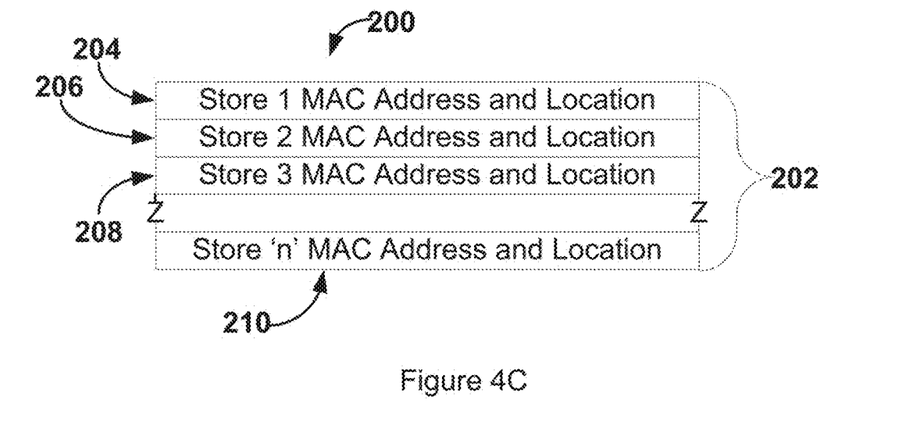
FIG. 4C shows a wired MAC database.

Now referencing FIG. 4C where 200 depicts wired MAC address database 203. In this depiction, the MAC addresses in the database correspond to that found in a given store. When the power is initially turned on for a given television (14, 16, or 18) for the first time, the television determines of it is connected by hard wire to a router or hard wired to access point 12. Television (14, 16, or 18) will, if it determines that it is hard wired to a network it will obtain the MAC address of the wired router or hub If any MAC addresses contained in MAC address database 203, the television is determined to be in a retail store and the television will command the display and audio attributes into retail mode then complete the process of booting the television.

Note that for FIGS. 4A, 4B, and 4 C, the database can be pre-populated with Wifi Mac addresses locations and SSIDs. In addition, the SSID can be recognized, for example, by looking for a store name in the SSID. For example, the wireless network within a store typically has that store name in it. One way to find that the devices in a store is to look at the wireless network name, such as "big box Wi-Fi" to determine that the television is in the store called big box.

As another example, the IP address in the wireless can be looked up, to attempt to match the source of the IP address with its location. If that source shows a retail location, the retail mode is set.

Figure 5A:
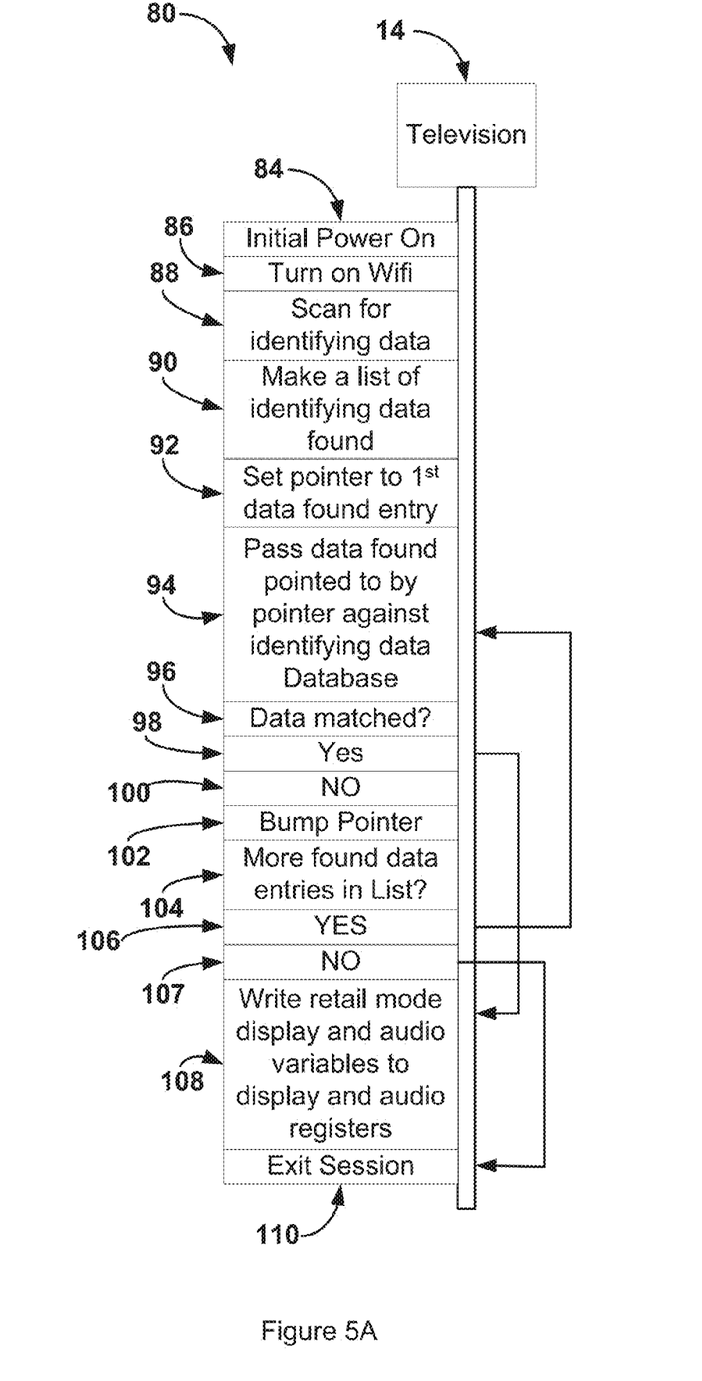
FIG. 5A is a schematic depiction of one embodiment of the invention where the invention attempts to use an available wireless network to determine if the television is located in a retail store.

Now referencing FIG. 5A where 80 depicts the logic flow chart where the television constructs a list of SSIDs found by monitoring the Wifi spectrum. This depiction starts with television 14 at processing block 84 "initial power on". This processing block begins execution when power is first applied to television 14 after which control falls through to processing block 86 "turn on Wifi". This processing block causes power to be applied to the Wifi chip set after which control falls through to processing block 88 "scan for identifying data". This processing block starts monitoring the Wifi spectrum after which control falls through to processing block 90 "make a list of identifying data found". This processing block records, in a list, the discovered SSID and MAC address of every Wifi access point in the vicinity of television 14 that is broadcasting its SSID. After the list is constructed, control will fall through to processing block 92 "set pointer to 1st data found entry". This processing block initializes the list of discovered SSIDs for matching against SSID database 62 after which control will fall through to processing block 94 "pass SSID pointed to by pointer against identifying data found database". This processing block passes the discovered SSID in the list of discovered SSIDs against each SSID entry contained in SSID database 62. After the scan is performed, control falls through to decision processing block 96 "Data matched?". If a match was made between the discovered SSID and any of the SSIDs contained in SSID database 62, control is transferred to results processing block 98 "YES" which transfers control to processing block 108 "write retail mode display and audio variables to display and audio registers" after which control falls through to exit processing block 110 "exit session" and finishes booting television.

Figure 5B:
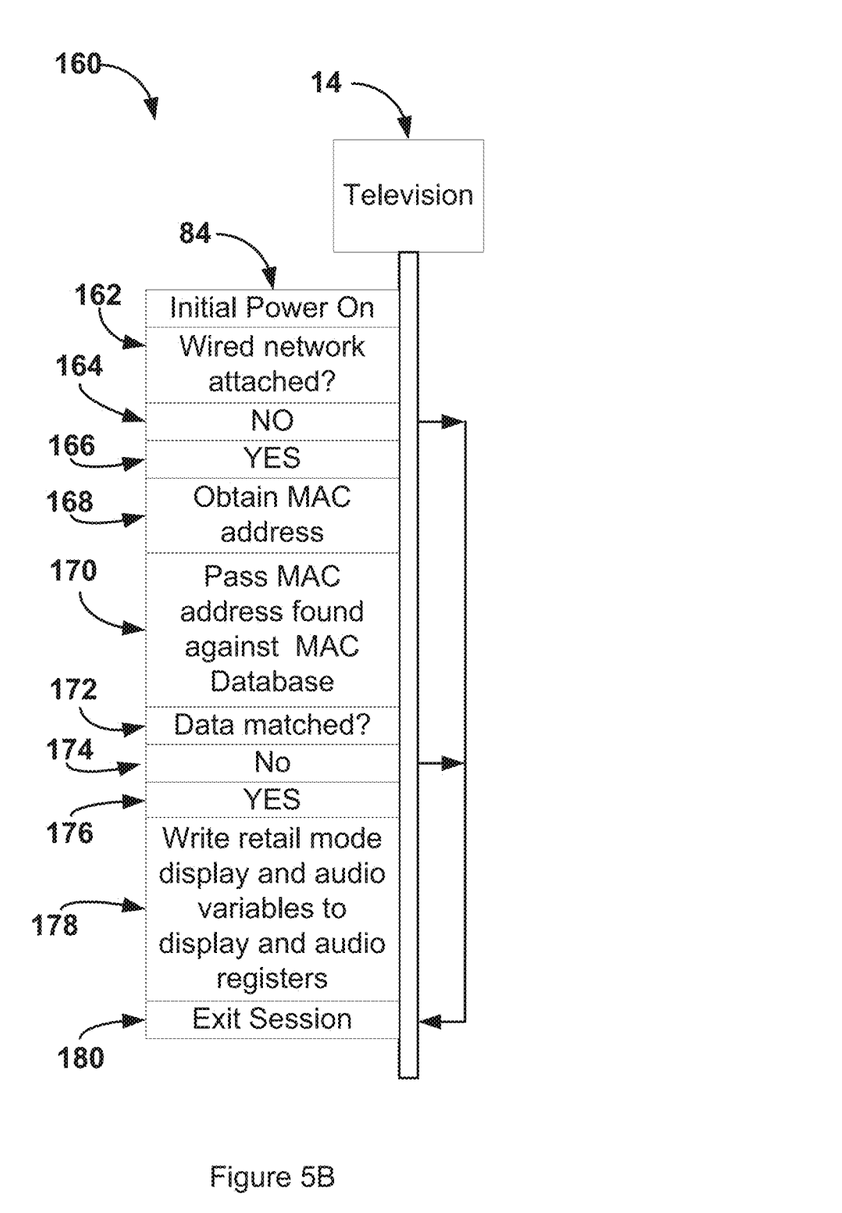
FIG. 5B is a schematic depiction of one embodiment of the invention where the invention attempts to use a wired network to determine of the television is located in a retail store.

Now referencing FIG. 5B where 100 depicts the logic flow chart where the television is connected to a wired network and obtains the MAC address of the router or hub it is connected to and searches through the MAC address database for a match. This depiction starts with television 14 at processing block 84 "initial power on". This processing block begins execution when power is first applied to television 14 after which control falls through to processing block 162 "wired network attached?". This processing block obtains the MAC address of the wired network after which control falls through to processing block 164 "NO". This processing block will, if television (14, 16, or 18) is not connected to a wired network, go to processing block 180 "exit session". If television (14, 16, or 18) is connected to a wired network control will fall through to processing block 166 "YES" after which control will fall through to processing block 168 "obtain MAC address". This processing block will interrogate the wired network and obtain the MAC address of the router/hub television (14, 16, or 18) is connected to after which controls will fall through to processing block 170 "Pass MAC address found against MAC database". This processing block will compare the MAC address of the router/hub against each entry of MAC database 202 until a match is found or the database is exhausted after which control will fall through to processing block 172 "Data matched?". If a match was not made between the router/hub MAC address and any of the MAC addresses contained in MAC database 202, control is transferred to processing block 174 "NO" which transfers control to processing block 180 "Exit session". If a match was made between the router/hub MAC address and any of the MAC addresses contained in MAC database 202, control is transferred to processing block 176 "YES" which transfers control to processing block 176 "write retail mode display and audio variables to display and audio registers" after which control falls through to exit processing block 180 "exit session" and finishes booting television.

Figure 6:
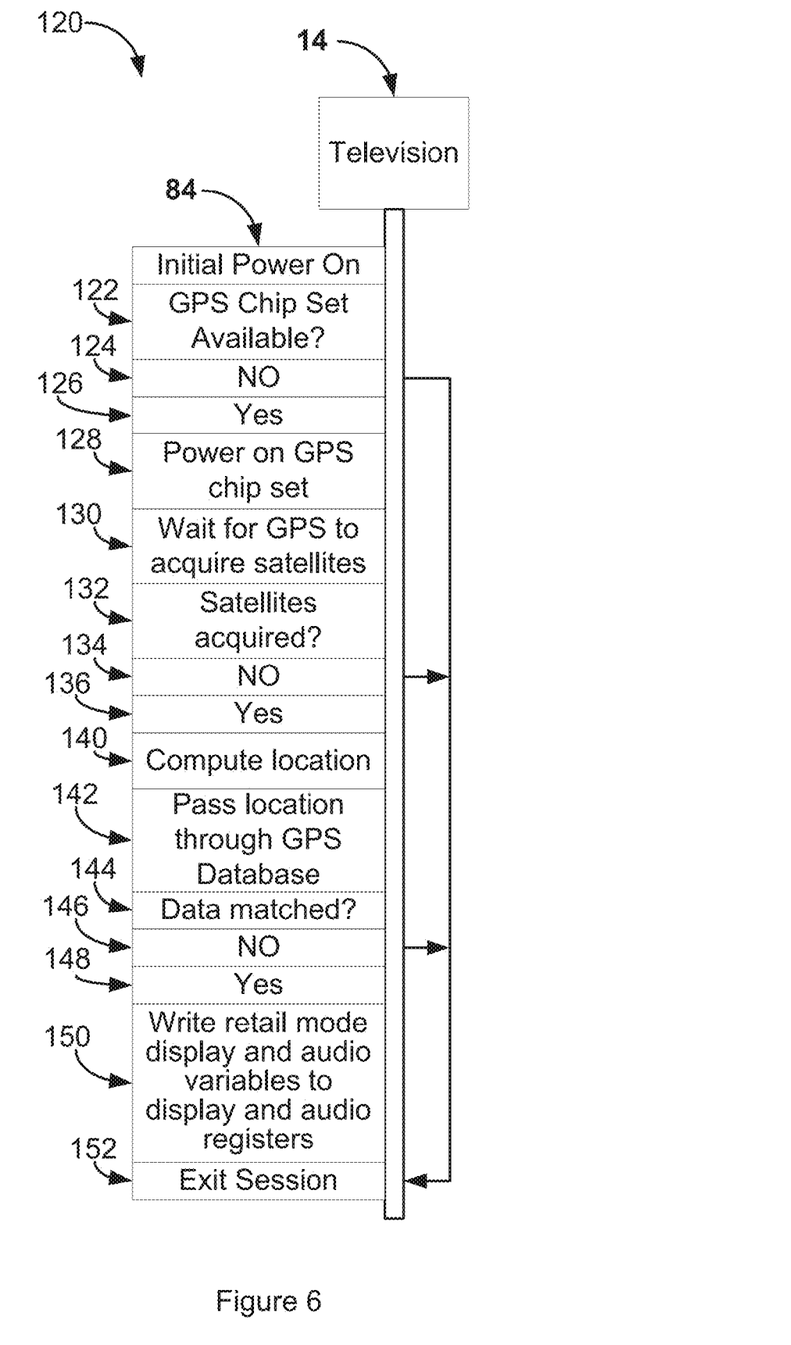
FIG. 6 is a schematic depiction of one embodiment of the invention where the invention attempts to use GPS coordinates to determine if the invention is located in a retail store.

Now referencing FIG. 6 where 120 depicts the logic flow chart where the television attempts to acquire at least a minimum number of GPS satellites to computes its current geographical location. This depiction starts with television 14 at processing block 84 "initial power on". This processing block begins execution when power is first applied to television 14 after which control falls through to processing block 122 "GPS chip set available?". This processing block determines if television 14 has an installed GPS device. If television 14 does not contain a GPS device, control will fall through to results processing block 124 "NO" after which control is transferred to exit processing block 152 "exit session". If television 14 does have a GPS device, control is transferred to results processing block 126 "YES" after which control will fall through to processing block 128 "power on GPS chip set". This processing block turns on power to the GPS device in television 14 after which control falls through to wait processing block 130 "wait for GPS to acquire satellites". This processing block waits a predetermined amount of time which should be sufficient for the GPS device to acquire a sufficient number of GPS satellites such that the invention can compute its location. After the wait period has expired, control falls through to decision processing block 132 "satellites acquired?". This processing determines wither any GPS satellites were acquired. There is also an issue of a GPS device not being able to acquire satellites in some buildings. If processing block 132 determines that GPS satellites were not acquired, control will fall through to results processing block 134 "NO" after which control will be transferred to exit processing block 152 "exit session." If the minimum number of satellites were acquired, control is transferred to results processing block 136 "YES" after which control will fall through to compute processing block 140 "compute location". This processing block computes the geographical coordinates of the location of the GPS device in television 14 after which control will fall through to processing block 142 "pass location through GPS database". This processing block compares, within the margin of error, the GPS computed coordinates against each entry in the GPS location database 42 after which control will fall through to decision processing block 144 "data matched?". If a match was not found between the GPS computed location and any of the entries in GPS location database 42, control will fall through to results processing block 146 "NO" after which control is transferred to exit processing block 152 "exit session". If a match was found between the GPS computed location and one of the entries in GPS location database 42, control is transferred to results processing block 148 "YES" after which control falls through to processing block 150 "write retail mode display and audio variables to display and audio registers". This processing block writes data to the display and audio control registers putting the television into retail mode after which control falls through to exit processing block 152 "exit session" and finish booting television 14.

Note also that the above has described operation with a television controlled by a processor. However, more generally, this can be used on any kind of device that displays videos, such as television sets, Set top boxes, Game consoles, Tuner dongles, Personal computers, and any other device having the ability to display AV content.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device comprising
a display screen;
an audio part that produces audio;
a processor that receives content and produces output for the display screen and for the audio part based on said content;
a memory, that stores settings for displaying the content;
said processor operating to determine wireless information in a location of the device, and to use said wireless information to determine if the device is in a retail store by comparing said information with information in a database that represents information of multiple different retail stores, and to store first settings in said memory that represent the device being in the retail store when the comparing indicates that the location of the device is in a retail store, said first settings comprise a first brighter output for the display screen and a second louder output for the audio part,
said processor operative to determine from said wireless information that the device is not in a retail store, and to store second settings in said memory that represent the device being in a non-retail setting responsive to determining from said wireless information that the device is not in the retail store, said second settings comprise a first less bright output for the display screen and a second less loud output for the audio part, further comprising a network interface, and the processor determines a location of the device by obtaining internet address information from signals received over the network interface and comparing said internet address information with said database, where said database stores internet address information correlated with retail locations,
wherein the network interface is a wireless network interface, and the processor determines the location based on identifying SSIDs in the wireless interface, and where the database stores SSIDs correlated with retail locations and compares the SSIDs identified in the wireless interface with SSIDs in the database, and determines the device to be a in the retail location when the SSIDs identified in the wireless interface match with SSIDs in the database,
wherein, when the SSIDs identified in the wireless interface do not match with SSIDs in the database, the processor uses a GPS location detection to determine if the to be in the retail location when the location detected by the GPS location matches with a location of a retail location as stored in the database.

2. The device as in claim 1, further comprising a GPS location detecting part, and where said processor determines the location of the device using an output from said GPS location detecting part.

3. The device as in claim 2, wherein said location detecting part is a GPS device.

4. The device as in claim 1, wherein the processor determines a location based on an IP lookup.

5. The device as in claim 1, wherein the processor determines the location by obtaining information from the wireless network interface, and looking up the information in a database.

6. The device as in claim 1, wherein said processor operates to determine the location of the device at startup, and operates the device after startup using said first settings or said second settings as determined during startup.

7. A method of operating a device that has a display screen and an audio part that produces audio, comprising:
receiving content and producing output for the display screen and for the audio part based on said content;
a memory, that stores settings for use in displaying the content;
receiving wireless signals, and looking up information from said wireless signals in a database to determine if the device is in a retail store;
storing first settings in said memory that represent the device being in the retail store based on said looking up determining that the device is in the retail store, said first settings comprise a first brighter output for the display screen and a second louder output for the audio part,
storing second settings in said memory that represent the device not being in a retail store when said wireless signals represent the device not being in a retail store, said second settings comprise a first less bright output for the display screen and a second less loud output for the audio part, further comprising connecting over a network interface, and the location of the device is determined from internet address signals received over the network interface and comparing said internet address information with said database, where said database stores internet address information correlated with retail locations,
wherein the location is determined based on SSIDs, where SSIDs identified in the wireless interface are compared with SSIDs in the database, and the device is determined to be a in the retail location when the SSIDs identified in the wireless interface match with SSIDs in the database,
wherein the location is determined based on based on looking for a first kind of information in said wireless signals, and using said first kind of information if found, and looking for a second kind of information in said wireless signals if said first kind of information is not found,
wherein the first kind of information is SSIDs from a wireless network, and said second kind of information is GPS, and both said first kind of information and said second kind of information are looked up in said database to find if they represent a retail store where SSIDs identified in the wireless interface are first compared with SSIDs in the database, and the device is determined to be a in the retail location when the SSIDs identified in the wireless interface match with SSIDs in the database, and when the SSIDs identified in the wireless interface do not match with SSIDs in the database, a GPS location detection is used to determine if the to be in the retail location when the location detected by the GPS location matches with a location of a retail location as stored in the database.

8. The method as in claim 7, wherein said determining comprises using a dedicated location detecting part, and determining the location of the device using an output from said dedicated location detecting part.

9. The method as in claim 8, wherein said location detecting part is a GPS device.

10. The method as in claim 9, wherein the network interface is a wireless network interface, and further comprising determining the location based on identifying signals in the wireless interface.

11. The method as in claim 7, wherein the location is determined at startup prior to operation of the device, and operates the device after startup using said first settings or said second settings as determined during startup.

12. A television device comprising
a display screen;
an audio part that produces audio;
a memory, that stores settings for displaying content;
a processor that receives content and produces output for the display screen and for the audio part based on said content, said processor operating during initial startup to receive wireless information in a location of the device, and to use said wireless information to determine if the device is in a retail store by comparing said information with information in a database that represents information of multiple different retail stores,
and to store first settings in said memory that represent the device being in the retail store when said device is determined by the comparing carried out by the processor to be in the retail store, said first settings comprise a first brighter output for the display screen and a second louder output for the audio part, and to store second settings in said memory that represent the device being in a non-retail setting, said second settings comprise a first less bright output for the display screen and a second less loud output for the audio part, and after storing said settings, continuing to start the television, and to thereafter operate the television using said settings, further comprising a network interface, and the processor determines a location of the device from SSIDs on signals received over the network interface by looking up the SSIDs in the database and compares the SSIDs identified in the wireless interface with SSIDs in the database, and determines the device to be a in the retail location when the SSIDs identified in the wireless interface match with SSIDs in the database,
wherein the device looks for a first kind of information in said wireless signals, and using said first kind of information if found, and looking for a second kind of information in said wireless signals if said first kind of information is not found, where one of said kinds of information is GPS information, and the other kind of information is SSIDs in a database where the device compares the SSIDs identified in the wireless interface with SSIDs in the database, and determines the device to be a in the retail location when the SSIDs identified in the wireless interface match with SSIDs in the database and when the SSIDs identified in the wireless interface do not match with SSIDs in the database, a GPS location detection is used to determine if the to be in the retail location when the location detected by the GPS location matches with a location of a retail location as stored in the database.

13. The device as in claim 12, further comprising a dedicated location detecting part, and where said processor determines the location of the device using an output from said dedicated location detecting part by looking up the location in the database.

* * * * *